US008035955B2

(12) United States Patent
Parks et al.

(10) Patent No.: US 8,035,955 B2
(45) Date of Patent: Oct. 11, 2011

(54) CORD PROTECTOR FOR POWER TOOLS

(75) Inventors: James Parks, White Hall, MD (US); Daniel Puzio, Baltimore, MD (US); Scott Rudolph, Aberdeen, MD (US); Richard C. Nickels, Hampstead, MD (US)

(73) Assignee: Black & Decker Inc., Newark, DE (US)

(*) Notice: Subject to any disclaimer, the term of this patent is extended or adjusted under 35 U.S.C. 154(b) by 759 days.

(21) Appl. No.: 12/164,621

(22) Filed: Jun. 30, 2008

(65) Prior Publication Data

US 2009/0000821 A1 Jan. 1, 2009

Related U.S. Application Data

(63) Continuation-in-part of application No. 11/860,989, filed on Sep. 25, 2007.

(60) Provisional application No. 60/863,467, filed on Oct. 30, 2006.

(51) Int. Cl.
*G06F 1/16* (2006.01)

(52) U.S. Cl. ................... 361/679.01; 439/447; 439/460; 248/56

(58) Field of Classification Search ............. 361/679.01; 248/56; 30/166.3, 388
See application file for complete search history.

(56) References Cited

U.S. PATENT DOCUMENTS

| | | | |
|---|---|---|---|
| 1,098,775 | A | 6/1914 | Wheelock |
| 1,880,069 | A | 9/1932 | Becker |
| 1,950,036 | A | 3/1934 | Preston |
| 2,365,785 | A | 12/1944 | Tinnerman |
| 2,800,933 | A | 7/1957 | Michael |
| 2,945,085 | A | 7/1960 | Billups |
| 3,056,852 | A | 10/1962 | Sachs |
| 3,123,662 | A | 3/1964 | Fink |
| 3,240,502 | A | 3/1966 | Snyder |
| 3,279,014 | A | 10/1966 | Fishcer |
| 3,546,502 | A | 12/1970 | Botefuhr et al. |
| 3,689,014 | A | 9/1972 | Fink |
| 3,958,300 | A | 5/1976 | Tanaka et al. |
| 4,078,309 | A | 3/1978 | Wilson |
| 4,095,043 | A | 6/1978 | Martin et al. |
| 4,289,923 | A | 9/1981 | Ebert |

(Continued)

FOREIGN PATENT DOCUMENTS

| | | |
|---|---|---|
| DE | 3820741 | 12/1989 |
| DE | 20119603 U1 | 2/2002 |
| DE | 10360373 B3 | 3/2005 |
| JP | 07-022761 A | 1/1995 |

(Continued)

OTHER PUBLICATIONS

International Search Report and Written Opinion Mailed Feb. 16, 2010.

(Continued)

*Primary Examiner* — Lisa Lea Edmonds
(74) *Attorney, Agent, or Firm* — Harness, Dickey & Pierce, P.L.C.

(57) ABSTRACT

A power tool having a housing, a motor disposed in the housing, a power cord connected to the motor, and a cord protector operably engaging the power cord. The cord protector comprising a spring member coupled to the housing on a first end and engaging the power cord on a second end. The spring member exerting a biasing force upon the power cord in response to a load being applied to the power cord and recovering to an initial position in response to removal of the load.

14 Claims, 7 Drawing Sheets

U.S. PATENT DOCUMENTS

| | | | | |
|---|---|---|---|---|
| 4,323,725 | A | 4/1982 | Muller | |
| 4,389,082 | A | 6/1983 | Lingaraju | |
| 4,406,064 | A | 9/1983 | Goss | |
| 4,787,145 | A | 11/1988 | Klicker et al. | |
| 5,676,339 | A * | 10/1997 | Simon | 248/56 |
| 5,850,698 | A | 12/1998 | Hurn et al. | |
| 6,152,639 | A * | 11/2000 | Hsu | 403/116 |
| 7,727,003 | B2 * | 6/2010 | Ceroll et al. | 439/447 |
| 2003/0100214 | A1 * | 5/2003 | Miyamoto et al. | 439/456 |
| 2004/0147160 | A1 * | 7/2004 | Weiss | 439/457 |
| 2009/0004908 | A1 * | 1/2009 | Ceroll et al. | 439/447 |
| 2009/0004909 | A1 * | 1/2009 | Puzio et al. | 439/460 |

FOREIGN PATENT DOCUMENTS

| | | | |
|---|---|---|---|
| JP | 2007022761 | A | 2/2007 |
| JP | 2007103253 | A | 4/2007 |
| WO | WO-2006093718 | A1 | 9/2006 |

OTHER PUBLICATIONS

Frisch, Ulrich—Partial Search Report on corresponding European Patent Application No. 09151463.8—Apr. 14, 2009—Munich.

European Search Report and Annex to the European Search Report Dated Jul. 17, 2009.

* cited by examiner

CORD PROTECTOR FOR POWER TOOLS

CROSS-REFERENCE TO RELATED APPLICATIONS

This application is a continuation in part of U.S. application Ser. No. 11/860,989 filed on Sep. 25, 2007, which claims the benefit of U.S. Provisional Application No. 60/863,467 filed on Oct. 30, 2006, the disclosures of which are incorporated herein by reference.

FIELD

The present disclosure relates to various improvements for power tools, and particularly to a cord set load protector.

BACKGROUND AND SUMMARY

The statements in this section merely provide background information related to the present disclosure and may not constitute prior art.

A common field failure with heavier portable power tools, such as portable saws, is a separation of the power cord from the tool due to an impulse load, or jerk, applied to the cord. This can occur when the tool is dropped while the plug end of the power cord is secured, or when a user carries the tool or lowers it from floor to floor or down a ladder by holding the power cord.

To isolate the power cord conductors or connections from the high forces imposed by jerking the power cord, the power cord according to the present disclosure is installed in the tool housing with a small service loop, or extra length of cable, between the cord clamp and the portion of the tool housing that secures the cord protector. A crimp-on device is installed on the power cord cable next to the cord protector. When the cord is subjected to jerking, the cable moves axially relative to the cord protector. As the cable moves, the crimp-on device compresses the extended end of the cord protector absorbing energy and reducing the forces transmitted to the cord set conductors or connections that are disposed within the housing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
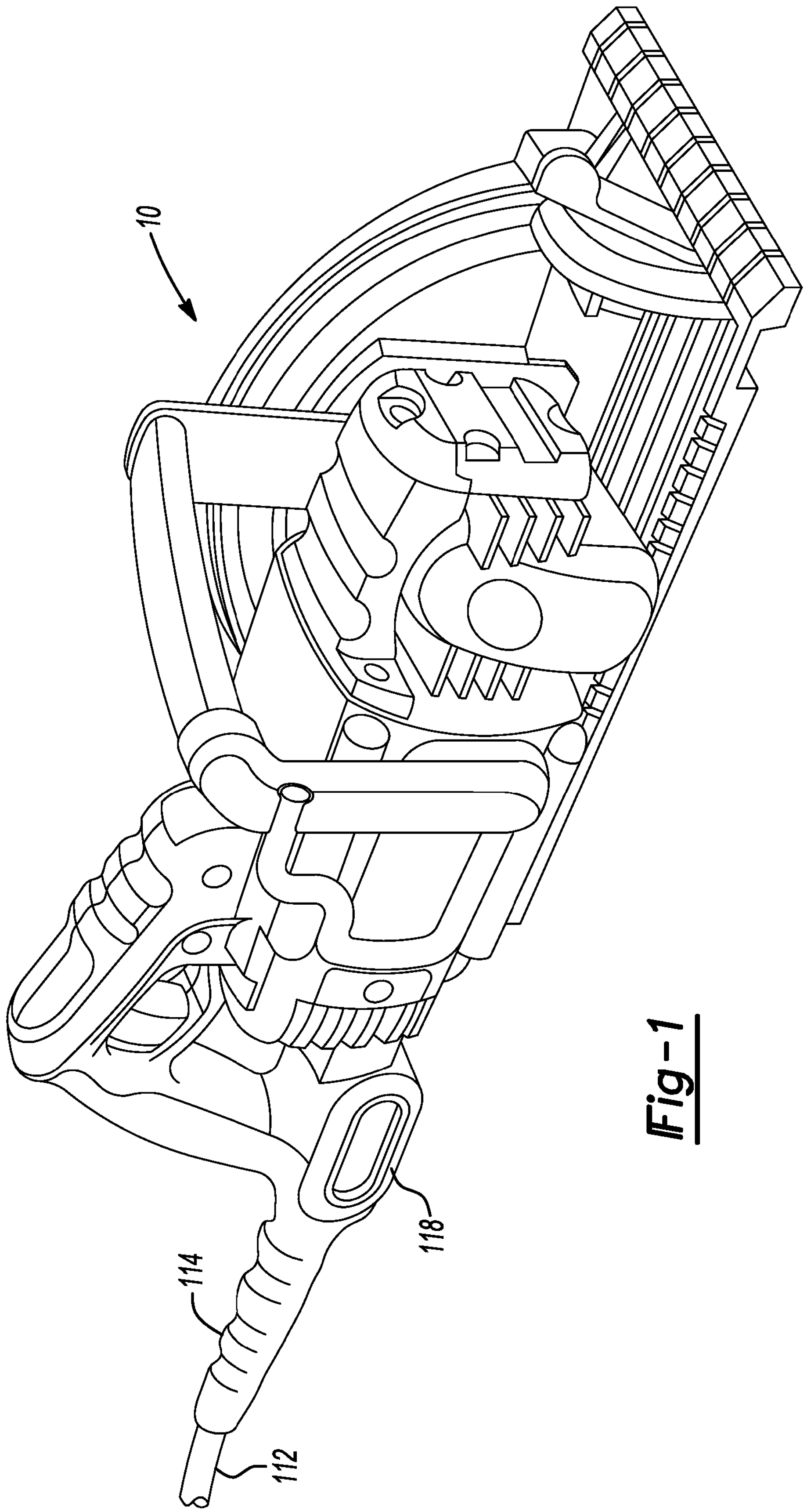
FIG. 1 is a perspective view of an exemplary worm drive saw with a tool hanger according to the principles of the present disclosure.

The following description is merely exemplary in nature and is not intended to limit the present disclosure, application, or uses. It should be understood that throughout the drawings, corresponding reference numerals indicate like or corresponding parts and features.

Figure 2:
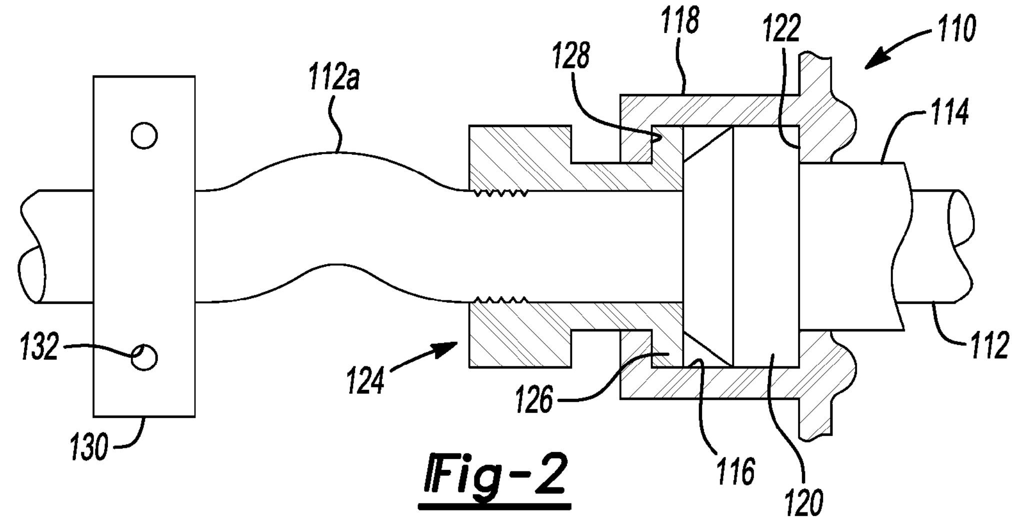
FIG. 2 is a cross-sectional view showing the cord set load protector according to the principles of the present disclosure, in an unloaded condition.

With reference to FIGS. 1 and 2, an exemplary power tool 10 is shown having a cord set load protector device 114 for preventing high forces imposed on a power cord 112 from impacting the connections of the cord 112 to the electrical power tool 10. As illustrated in FIG. 1, the power tool 10 includes a cord 112 and a cord protector 114 extending from the rear end of the tool. The cord protector 114 is mounted within a recess 116 provided in the power tool housing 118. The recess 116 can be square or round in cross-section and defines a cavity therein for receiving a radially extending flange portion 120 of the elastomeric cord protector 114. The radial extending flange portion 120 is disposed against a shoulder portion 122. A crimp-on device 124 is clamped or crimped onto the power cord 112 and includes a radially extending flange portion 126 which is disposed against an end portion of the cord protector 114 inside of the chamber 116 of housing 118. The flange portion 126 is disposed against a radially inwardly extending shoulder 128 of the cavity 116 provided in the housing 118.

The crimp-on device 124 engages the power cord so as to be axially and rotatably fixed to the power cord 112 in a manner that will be described in greater detail herein. The power cord 112 is also clamped to the tool housing by a cord clamp 130 provided within the power tool 10 in such a way that an extra cable length 112*a* is provided within the housing between the crimp-on device 124 and cord clamp 130. The cord clamp 130 can be mounted to the housing by fasteners 132 or by other known securing methods, such as rivets, welds, grommets, etc. The cord clamp 130 can be spaced from the recess 116 by up to several inches. Locating the cord clamp 130 further inward from the recess 116 improves cord flex durability by placing the cord stresses from the cord being flexed and the stresses on the cord due to the clamp at two different locations instead of both being generally at the same location. This improves the flex life of the conductors.

Figure 3:
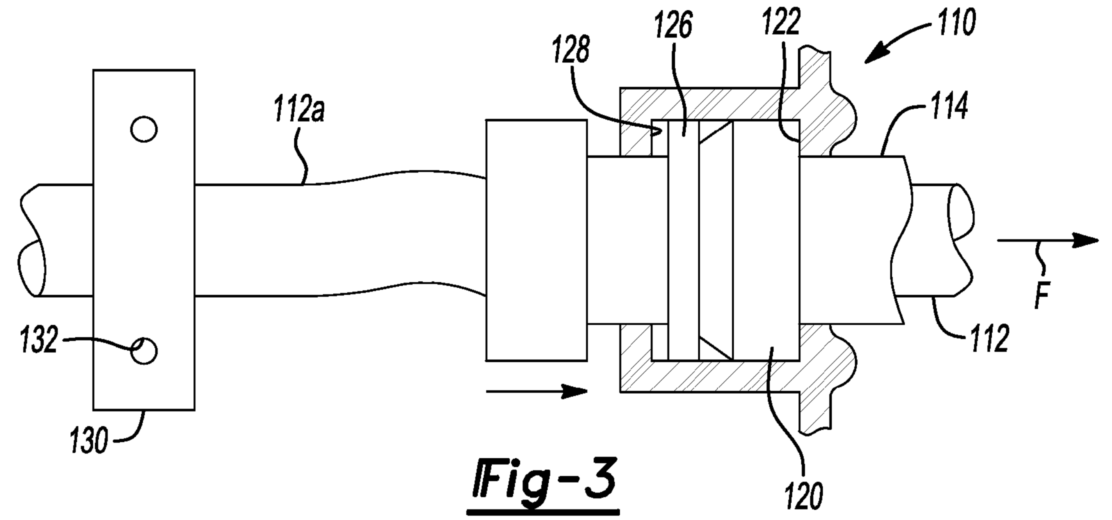
FIG. 3 is a view similar to FIG. 2 with a load applied to the cord.

When a large force F is applied to the power cord 112, as illustrated in FIG. 3, the power cord 112 is pulled in the axial direction of the force F. The movement of the power cord 112 relative to the housing 118 causes the crimp-on device 124 to move axially relative to the shoulder portion 128 so that the flange portion 126 of crimp-on device 124 compresses the flange portion 120 of cord protector 114, thereby absorbing the force exerted on the cord 112. The axial movement of the crimp-on device relative to the cord clamp 130 takes up some of the extra cable length 112*a* provided therebetween without exerting forces upon the cord clamp 130.

Figure 4:
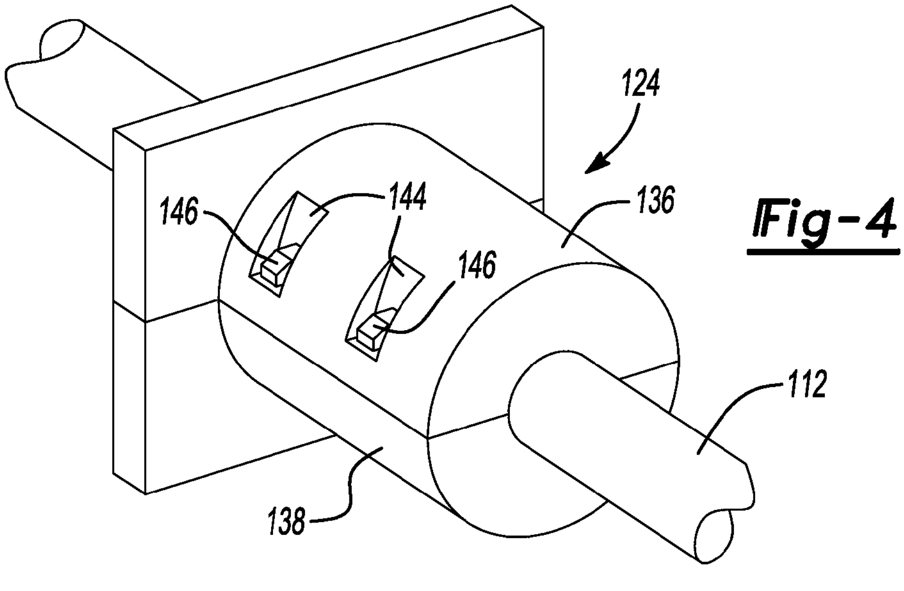
FIG. 4 is a perspective view of an exemplary cord clamp utilized with the cord set load protector according to the principles of the present disclosure.
Figure 5:
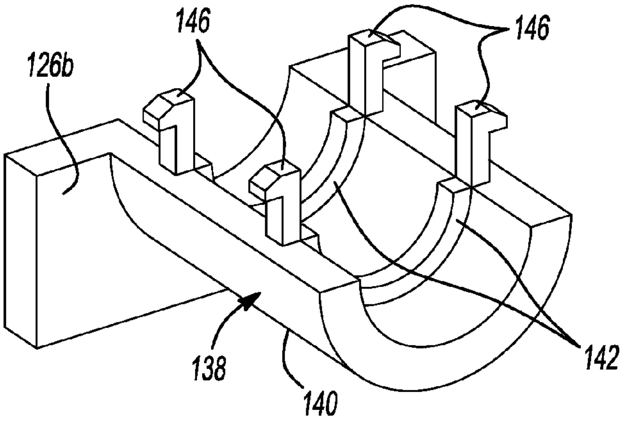
FIG. 5 is a perspective view of a first clamp half.
Figure 6:
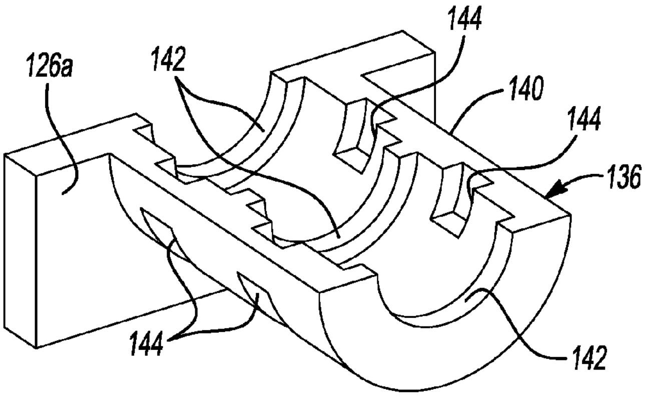
FIG. 6 is a perspective view of a second clamp half.

The crimp-on device 124 can take-on many forms. By way of example, as illustrated in FIGS. 4 and 6, the crimp-on device 124 can include a first clamp half 136 and a second clamp half 138. Each clamp half 136, 138 is provided with semi-cylindrical body portions 140 each provided with a plurality of radially inwardly extending ribs 142 designed to engage and clamp against the outer surface of the power cord 112. The first clamp half 136 is provided with a plurality of apertures 144 each adapted to receive a plurality of corresponding locking fingers 146 provided on the second clamp half 138. Each of the first and second clamp halves 136, 138 include radial flange portions 126*a*, 126*b*, respectively, which define the radially extending flange portion 126 of the crimp-on device 124. The locking fingers 146 secure the second clamp half 138 to the first clamp half 136 in a clamping engagement on the power cord 112 so as to prevent axial or rotational movement of the power cord 112 relative to the clamp device 124. It should be understood that other clamp or crimp-on arrangements can be utilized with the cord-set load protector 110, according to the principles of the present disclosure.

Figure 7:
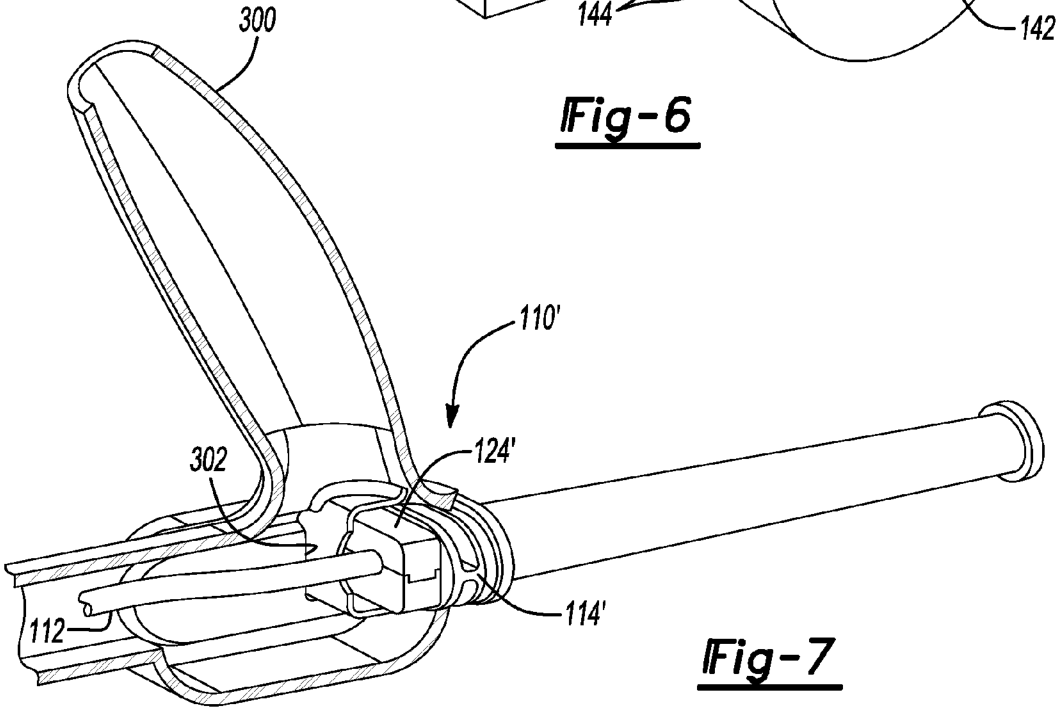
FIG. 7 is a perspective view of an alternative cord set load protector design with the handle partially removed for illustrative purposes.
Figure 8:
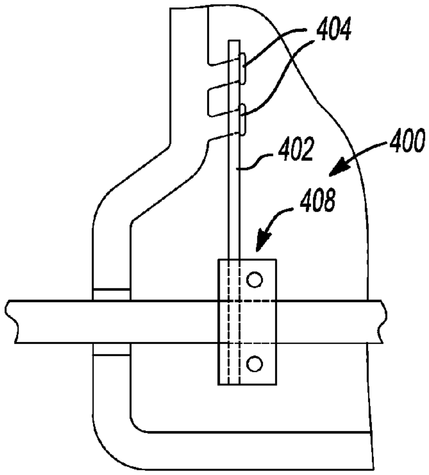
FIG. 8 is a front view of the cord set load protector design in an initial position according to some embodiments having a spring lever.

With reference to FIG. 7, an alternative cord set load protector 110' is shown including a split clamp device 124' received in a recess 302 within the handle section 300 to prevent the assembly from twisting or being pushed into the handle set. The split clamp 124' is independent of the handle set 300 and traps the complete cord set 112 and secondary wrap of filler strands. The cord protector 114' includes added material at the mounting end that prevents twist and creates a spring to absorb shock.

In some embodiments, as illustrated in FIGS. 8-16, cord set load protector 110 can comprise a spring lever assembly 400. In some embodiments, spring lever assembly 400 can comprise a spring lever 402 and a cord clamp 130 fixedly coupled to spring lever 402 and power cord 112. As illustrated in FIGS. 8-14, spring lever 402 can be fixedly coupled to housing 118 via one or more retaining members 404 extending from housing 118. More particularly, spring lever 402 can comprise a plurality of corresponding mounting apertures 406 (see FIG. 15) sized to receive retaining members 404 therethrough. In some embodiments, retaining members 404 can be deformable, such as through heat staking or welding, to permanently retain spring lever 402 in a predetermined operable position (see FIG. 14). Retaining members 404 can be spaced apart to define a plane extending between the centers thereof, wherein the plane is generally orthogonal to a longitudinal axis of power cord 112. Additionally, retaining member 404 can be a sleeve or slot formed in housing 118 for receiving and retaining an end of spring lever 402.

In some embodiments, cord set load protector 110 can comprise a cord clamp 408 fixedly coupled to spring lever 402. In some embodiments, as illustrated in FIGS. 8-16, cord clamp 408 can comprise a pair of clamping members 410 adapted to be coupled together via fasteners 412 (FIG. 14). Specifically, each clamping member 410 can comprise an enlarged aperture 414 for permitting a shank portion of fastener 412 to pass through and a threaded aperture 416 for threadedly engaging fastener 412. Each clamping member 410 can comprise a slot 418 formed therein to capture a side of spring lever 402 and a generally circular portion 420 to capture power cord 112. In this manner, cord clamp 408 can be mounted on an end of spring lever 402 such that the slot 418 of each clamping member 410 engages a side of spring lever 402. Similarly, power cord 112 can extend between clamping member 410. Upon tightening of fasteners 412, clamping members 410 are drawn together to exert a clamping and retaining force on both spring lever 402 and power cord 112. In this manner, cord clamp 408 is fixedly coupled to power cord 112 for movement therewith. It should be appreciated that clamping members 410 are configured such that a single manufacturing piece can be used on opposing sides of spring lever 402.

Figure 15:
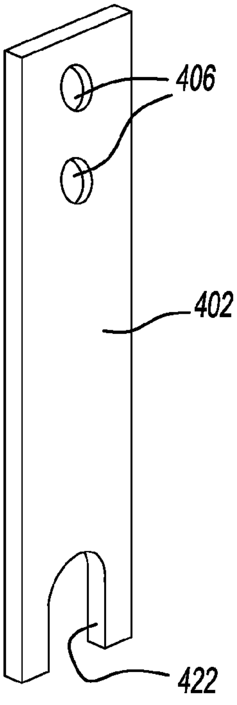
FIG. 15 is a perspective view of the spring lever.
Figure 16:
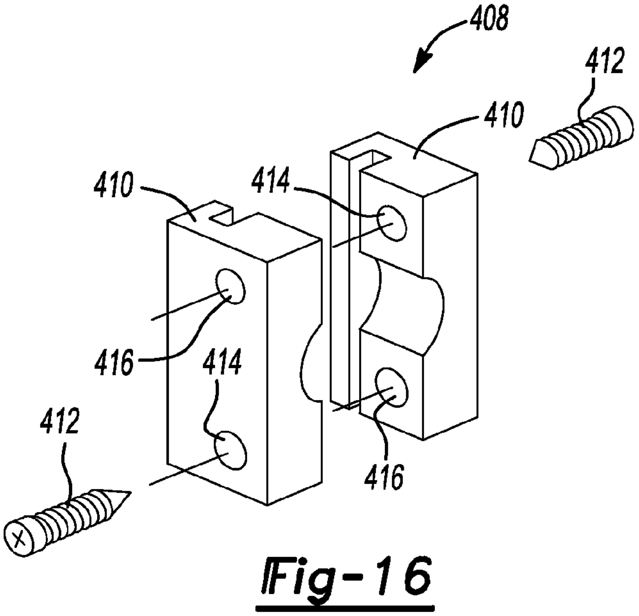
FIG. 16 is a perspective view of cord clamp.

With reference to FIG. 15, spring lever 402 can comprise a slotted end 422 for receiving power cord 112 therethrough.

Figure 9:
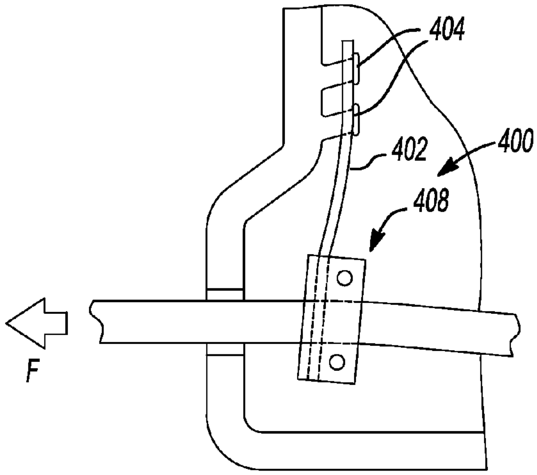
FIG. 9 is a front view of the cord set load protector design according to FIG. 8 in a deflected position.
Figure 10:
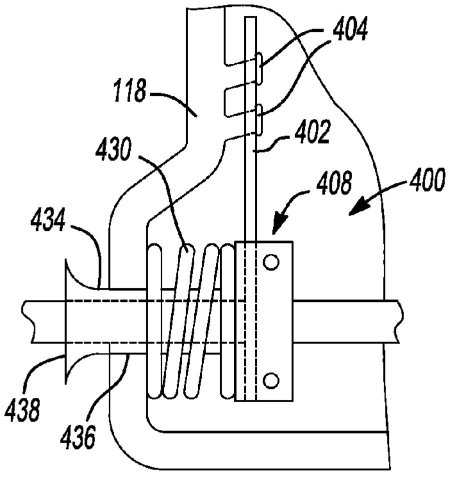
FIG. 10 is a front view of the cord set load protector design in an initial position according to some embodiments having a spring lever and supplemental spring.
Figure 11:
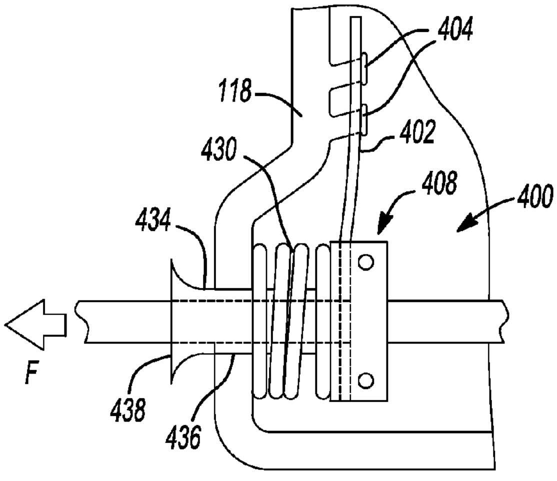
FIG. 11 is a front view of the cord set load protector design according to FIG. 10 in a deflected position.
Figure 12:
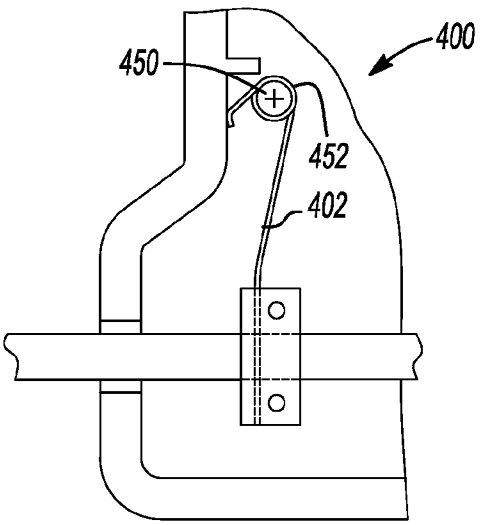
FIG. 12 is a front view of the cord set load protector design in an initial position according to some embodiments having a spring lever and torsion spring.
Figure 13:
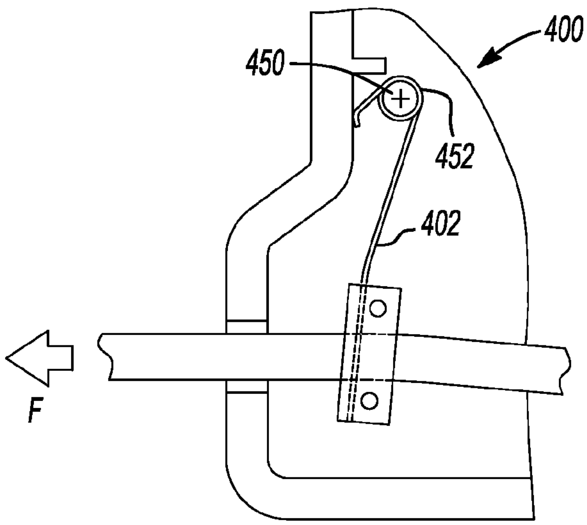
FIG. 13 is a front view of the cord set load protector design according to FIG. 12 in a deflected position.
Figure 14:
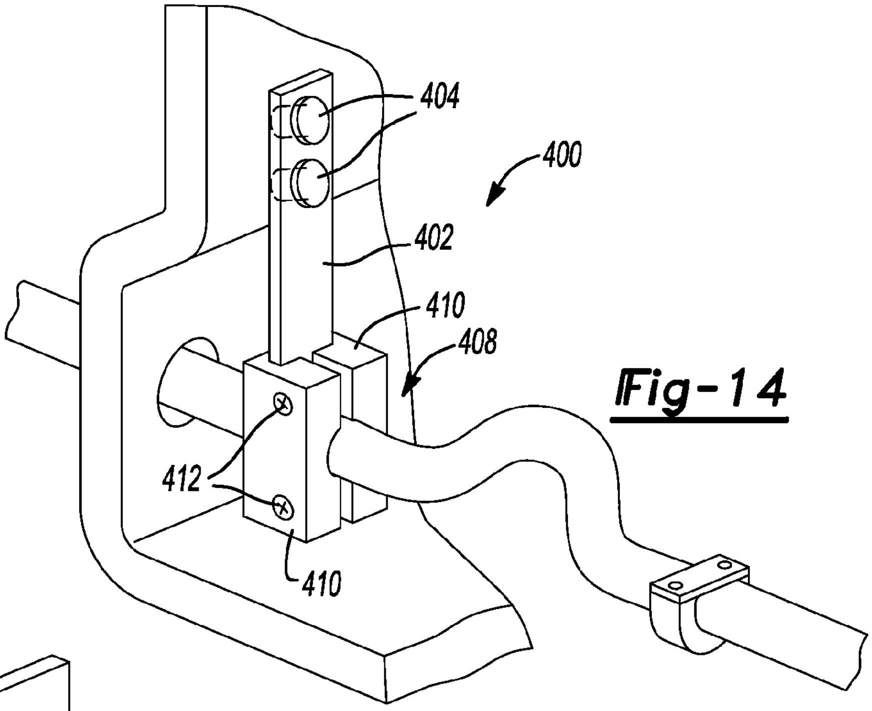
FIG. 14 is a perspective view of a cord set load protector design according to some embodiments having a spring lever and cord clamp.
Figure 17:
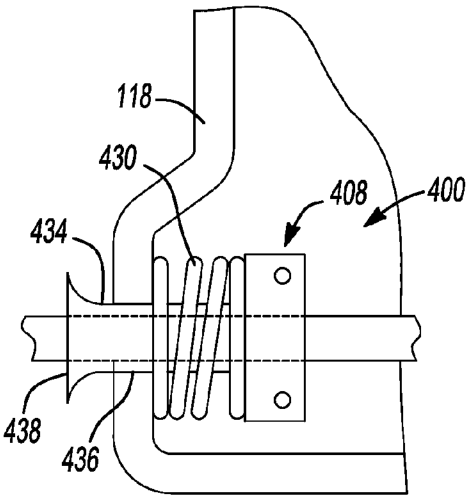
FIG. 17 is a front view of the cord set load protector design in an initial position according to some embodiments having a spring member.
Figure 18:
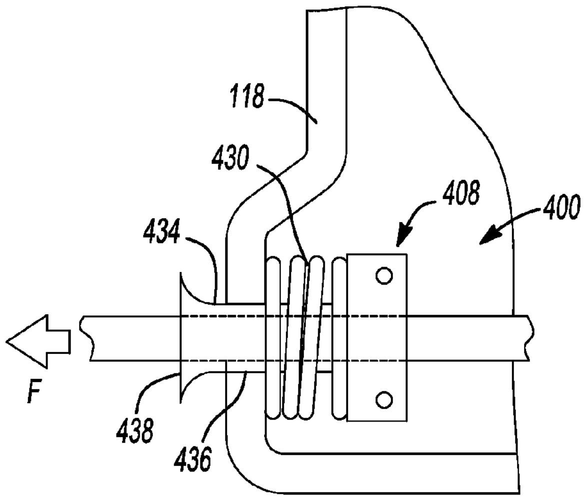
FIG. 18 is a front view of the cord set load protector design according to FIG. 17 in a deflected position.

During use, if sufficient force is applied to power cord 112, the associated force is transmitted through cord clamp 408 and against spring lever 402 to deflect spring lever 402 between a relaxed position (FIGS. 8, 10, 12, and 14) and a deflected position (FIGS. 9, 11, and 13). This deflection provides force absorption along axis PC. The biasing force of spring lever 402 can be determined based upon, in part, the size and length of spring lever 402 and the material thereof. It should be understood, however, that in some embodiments additional biasing force may be desired. In such cases, a supplemental spring member 430 (FIGS. 10 and 11) may be used disposed between cord clamp 408 and housing 118. Supplemental spring 430 can be a compression spring having either linear or progressive spring rates. Additionally, supplemental spring member 430 could include a coil spring, torsion spring, elastomeric member, or the like. Spring member 430 can be disposed coaxial with power cord 112 to maintain alignment of spring member 430 with power cord 112. It should be appreciated that spring member 430 can be used separate from spring lever 402, such as illustrated in FIGS. 17 and 18.

In some embodiments, as illustrated in FIGS. 12 and 13, spring lever 402 can be pivotally coupled about an axis 450 for pivotal movement between a relaxed position (FIG. 12) and a deflected position (FIG. 13). In this embodiment, a torsion spring 452 can be used for applying an opposing biasing force to power cord 112 when under load.

In some embodiments, a bellmouth 434 can be used to limit the deflection of power cord 112 exiting housing 118. Bellmouth 434 can comprise a generally linear body portion 436 and a curved exit 438 having an curved profile. Bellmouth 434 can be fixedly coupled to cord clamp 408 for movement therewith such that it moves together with cord clamp 408 when power cord 112 is under load.

It should be appreciated that spring lever 402 can include features, materials, or employ other manufacturing techniques directed to tailoring a compliant response when under load (i.e. a biasing profile). For instance, in some embodiments, spring lever 402 can comprise a molded or formed member having a cross-sectional shape that is non-planar and/or non-uniform. This cross-sectional shape can provide a non-linear compliant response when under load to permit initial deflection under light loads and progressively less deflection under heavier loads.

It should be appreciated from the foregoing that one or more of the disclosed embodiments can be used concurrently to provide improved tailoring of the biasing profile and increased cord protection.

What is claimed is:

1. A power tool, comprising:
a tool body having a housing;
a motor disposed in said housing;
a power cord connected to said motor; and
a cord protector operably engaging said power cord, said cord protector comprising a spring lever member coupled to said housing on a first end and engaging said power cord on a second end, said spring lever exerting a biasing force upon said power cord in response to a load being applied to said power cord, said spring lever recovering to an initial position in response to removal of said load.

2. The power tool according to claim 1, further comprising:
a cord clamp fixedly coupling said second end of said spring lever to said power cord.

3. The power tool according to claim 2 wherein said cord clamp comprises:
a pair of clamping members each having a first slot for engaging said spring lever and a second slot for engaging said power cord.

4. The power tool according to claim 1, further comprising:
a spring member disposed between said spring lever and said housing, said spring member exerting a biasing force upon at least one of said power cord and said spring lever.

5. The power tool according to claim 4 where said spring member is coaxial with said power cord.

6. The power tool according to claim 1 wherein said spring lever is coupled to said housing at said first end through heat staking.

7. The power tool according to claim 1 wherein said spring lever is pivotally coupled to said housing at said first end and said power tool further comprises a torsion spring biasing said spring lever in to said initial position.

8. The power tool according to claim 1, further comprising:
a bellmouth member fixedly coupled with said cord protector, said bellmouth member having a bell shaped portion and shaped to receive said power cord therethrough.

9. The power tool according to claim 1 wherein said spring lever provides a non-uniform biasing force.

10. A power tool, comprising:
a tool body having a housing;
a motor disposed in said housing;
a power cord connected to said motor; and
a cord protector operably engaging said power cord, said cord protector comprising a spring member engaging said housing on a first end and engaging said power cord on a second end, said spring member exerting a biasing force upon said power cord in response to a load being applied to said power cord, said spring member recovering to an initial position in response to removal of said load.

11. The power tool according to claim 10, further comprising:
a cord clamp engaging said second end of said spring member and said power cord.

12. The power tool according to claim 10 where said spring member is coaxial with said power cord.

13. The power tool according to claim 10, further comprising:
a bellmouth member fixedly coupled with said cord protector, said bellmouth member having a bell shaped portion and shaped to receive said power cord therethrough.

14. The power tool according to claim 10 wherein said spring member provides a non-uniform biasing force.

* * * * *